United States Patent
Kambhatla

(10) Patent No.: US 12,136,368 B2
(45) Date of Patent: Nov. 5, 2024

(54) IMAGING FOR FOLDABLE DISPLAYS

(71) Applicant: Intel Corporation, Santa Clara, CA (US)

(72) Inventor: Srikanth Kambhatla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/160,808

(22) Filed: Jan. 27, 2023

(65) Prior Publication Data

US 2023/0282140 A1    Sep. 7, 2023

Related U.S. Application Data

(63) Continuation of application No. 14/751,684, filed on Jun. 26, 2015, now Pat. No. 11,676,518.

(Continued)

(51) Int. Cl.
*G09G 5/14* (2006.01)
*G06F 1/16* (2006.01)
(Continued)

(52) U.S. Cl.
CPC .......... *G09G 3/003* (2013.01); *G06F 1/1641* (2013.01); *G09G 3/035* (2020.08); *G09G 5/003* (2013.01);
(Continued)

(58) Field of Classification Search
CPC ........ G09G 3/003; G09G 3/035; G09G 5/003; G09G 5/14; G09G 2340/0492;
(Continued)

(56) References Cited

U.S. PATENT DOCUMENTS 6,115,025 A    9/2000  Buxton et al.
7,091,926 B2   8/2006  Kulas
(Continued)

FOREIGN PATENT DOCUMENTS

CN    103477304 A    12/2013
KR    20110055718 A   5/2011
(Continued)

OTHER PUBLICATIONS

International Searching Authority, "International Search Report of the International Searching Authority," issued in connection with International Application No. PCT/US2015/000395, dated Aug. 24, 2016, 3 pages.

(Continued)

*Primary Examiner* — Jeff Piziali
(74) *Attorney, Agent, or Firm* — Hanley, Flight & Zimmerman, LLC

(57) ABSTRACT

A processing unit, comprising a display interface to control a foldable display with multiple segments created by fold lines in the foldable display. The processing unit also including a plurality of lanes to connect the display interface to the foldable display, where each segment of the foldable display is connected to a lane. The processing unit also including a multi-segment protocol component to instruct the display interface to drive data to each segment of the display through the plurality of lanes.

8 Claims, 8 Drawing Sheets

Related U.S. Application Data

(60) Provisional application No. 62/154,529, filed on Apr. 29, 2015.

(51) Int. Cl.
  *G09G 3/00* (2006.01)
  *G09G 5/00* (2006.01)

(52) U.S. Cl.
  CPC ....... *G09G 5/14* (2013.01); *G09G 2340/0492* (2013.01)

(58) Field of Classification Search
  CPC ............. G09G 5/006; G09G 2330/021; G09G 2380/02; G06F 1/1641; G06F 3/1431
  See application file for complete search history.

(56) References Cited

U.S. PATENT DOCUMENTS

| | | | |
|---|---|---|---|
| 7,782,274 | B2 | 8/2010 | Manning |
| 7,787,917 | B2 | 8/2010 | Aoki et al. |
| 8,170,631 | B2 | 5/2012 | Aoki et al. |
| 8,259,080 | B2 | 9/2012 | Casparian et al. |
| 8,508,433 | B2 | 8/2013 | Manning |
| 8,669,918 | B2 | 3/2014 | Manning |
| 8,803,816 | B2 | 8/2014 | Kilpatrick, II et al. |
| 8,825,121 | B2 | 9/2014 | Aoki et al. |
| 8,836,611 | B2 | 9/2014 | Kilpatrick, II et al. |
| 8,860,632 | B2 | 10/2014 | Kilpatrick, II et al. |
| 8,860,765 | B2 | 10/2014 | Kilpatrick, II et al. |
| 8,863,038 | B2 | 10/2014 | King |
| 8,866,840 | B2 | 10/2014 | Dahl |
| 8,872,729 | B2 | 10/2014 | Lyons |
| 8,907,864 | B2 | 12/2014 | Manning |
| 8,933,874 | B2 | 1/2015 | Lundqvist |
| 8,947,320 | B2 | 2/2015 | King |
| 8,970,449 | B2 | 3/2015 | Manning |
| 9,009,984 | B2 | 4/2015 | Caskey |
| 9,122,249 | B2 | 9/2015 | Lyons |
| 9,250,851 | B2 | 2/2016 | Lu |
| 9,489,080 | B2 | 11/2016 | Seo et al. |
| 9,684,342 | B2 | 6/2017 | Kim et al. |
| 11,188,127 | B2 | 11/2021 | Therien |
| 11,656,657 | B2 | 5/2023 | Therien |
| 11,676,518 | B2 | 6/2023 | Kambhatla |
| 2003/0151562 | A1 | 8/2003 | Kulas |
| 2007/0285341 | A1 | 12/2007 | Manning |
| 2008/0158795 | A1 | 7/2008 | Aoki et al. |
| 2009/0244016 | A1 | 10/2009 | Casparian et al. |
| 2010/0060664 | A1 | 3/2010 | Kilpatrick, II et al. |
| 2010/0064244 | A1* | 3/2010 | Kilpatrick, II ...... H04M 1/0243 |
| | | | 345/1.3 |
| 2010/0064536 | A1 | 3/2010 | Caskey |
| 2010/0066643 | A1 | 3/2010 | King |
| 2010/0079355 | A1 | 4/2010 | Kilpatrick, II et al. |
| 2010/0085274 | A1 | 4/2010 | Kilpatrick, II et al. |
| 2010/0085382 | A1 | 4/2010 | Lundqvist |
| 2010/0182265 | A1 | 7/2010 | Kim et al. |
| 2010/0207844 | A1 | 8/2010 | Manning |
| 2010/0289730 | A1 | 11/2010 | Aoki et al. |
| 2011/0126141 | A1 | 5/2011 | King |
| 2011/0216064 | A1 | 9/2011 | Dahl |
| 2011/0241973 | A1 | 10/2011 | Manning |
| 2011/0241974 | A1* | 10/2011 | Manning ............... G06F 1/1618 |
| | | | 345/1.3 |
| 2012/0084722 | A1 | 4/2012 | Cassar |
| 2012/0162049 | A1 | 6/2012 | Aoki et al. |
| 2012/0188153 | A1 | 7/2012 | Tziortzis |
| 2012/0242599 | A1 | 9/2012 | Seo |
| 2012/0280924 | A1* | 11/2012 | Kummer ............... G06F 1/1641 |
| | | | 345/173 |
| 2012/0299813 | A1 | 11/2012 | Kang |
| 2012/0299845 | A1 | 11/2012 | Seo |
| 2012/0306782 | A1 | 12/2012 | Seo |
| 2013/0083496 | A1 | 4/2013 | Franklin |
| 2013/0120912 | A1 | 5/2013 | Ladouceur |
| 2013/0271350 | A1 | 10/2013 | Lyons |
| 2013/0271351 | A1 | 10/2013 | Lyons |
| 2013/0271355 | A1 | 10/2013 | Lyons |
| 2013/0271389 | A1 | 10/2013 | Lyons |
| 2013/0271390 | A1 | 10/2013 | Lyons |
| 2013/0271392 | A1 | 10/2013 | Lyons |
| 2013/0271495 | A1 | 10/2013 | Nguyen |
| 2013/0321340 | A1 | 12/2013 | Seo |
| 2013/0342439 | A1 | 12/2013 | Kwack |
| 2013/0342483 | A1 | 12/2013 | Seo |
| 2014/0049450 | A1 | 2/2014 | Manning |
| 2014/0062856 | A1* | 3/2014 | Lu ......................... G06F 1/1677 |
| | | | 345/156 |
| 2014/0101579 | A1 | 4/2014 | Kim |
| 2015/0009128 | A1 | 1/2015 | Matsumoto |
| 2015/0309691 | A1 | 10/2015 | Seo et al. |
| 2015/0378395 | A1 | 12/2015 | Manning |
| 2015/0378503 | A1 | 12/2015 | Seo |
| 2016/0147362 | A1 | 5/2016 | Eim et al. |
| 2016/0321969 | A1 | 11/2016 | Kambhatla |
| 2016/0372083 | A1 | 12/2016 | Taite et al. |
| 2017/0052698 | A1 | 2/2017 | Seo |
| 2021/0034107 | A1 | 2/2021 | Therien et al. |
| 2022/0197344 | A1 | 6/2022 | Therien et al. |

FOREIGN PATENT DOCUMENTS

| | | |
|---|---|---|
| KR | 20140046319 A | 4/2014 |
| TW | 201024977 A | 7/2010 |
| TW | 201351206 A | 12/2013 |
| TW | 201351268 A | 12/2013 |
| TW | 201411419 A | 3/2014 |

OTHER PUBLICATIONS

International Searching Authority, "Written Opinion of the International Searching Authority," issued in connection with International Application No. PCT/US2015/000395, dated Aug. 24, 2016, 6 pages.

International Bureau, "International Preliminary Report on Patentability," issued in connection with International Patent Application No. PCT/US2015/000395, dated Jul. 5, 2018, 8 pages.

United States Patent and Trademark Office, "Non-Final Office Action," issued in connection with U.S. Appl. No. 15/777,559, dated Feb. 22, 2021, 7 pages.

United States Patent and Trademark Office, "Notice of Allowance and Fee(s) Due," issued in connection with U.S. Appl. No. 15/777,559, dated Jul. 20, 2021, 7 pages.

International Searching Authority, "International Search Report and Written Opinion," issued in connection with PCT Application No. PCT/2016/019920, dated Jun. 8, 2016, 15 pages.

Taiwanese Patent Office, "IPO Search Report," issued in connection with Taiwan Patent Application No. 105109009, dated Apr. 13, 2017, 2 pages.

International Bureau, "International Preliminary Report on Patentability," issued in connection with PCT Application No. PCT/US2016/019920, dated Oct. 31, 2017, 8 pages.

Korean Patent Office, "Office Action," issued in connection with Korean Patent Application No. 10-2016-0034799, dated Jul. 28, 2017, 13 pages (English translation included).

Korean Patent Office, "Written Decision on Registration," issued in connection with Korean Patent Application No. 10-2016-0034799, dated Nov. 9, 2017, 4 pages (English translation included).

Taiwanese Patent Office, "Allowance Decision of Examination," issued in connection with Taiwanese Patent Application No. 105109009, dated Aug. 28, 2017, 2 pages.

United States Patent and Trademark Office, "Non-Final Office Action," issued in connection with U.S. Appl. No. 17/537,271, dated May 3, 2022, 4 pages.

United States Patent and Trademark Office, "Notice of Allowance and Fee(s) Due," issued in connection with U.S. Appl. No. 17/537,271, dated Sep. 7, 2022, 9 pages.

(56) References Cited

OTHER PUBLICATIONS

United States Patent and Trademark Office, "Notice of Allowance and Fee(s) Due," issued in connection with U.S. Appl. No. 17/537,271, dated Jan. 19, 2023, 8 pages.
United States Patent and Trademark Office, "Corrected Notice of Allowability," issued in connection with U.S. Appl. No. 17/537,271, dated Apr. 24, 2023, 2 pages.
United States Patent and Trademark Office, "Non-Final Office Action," issued in connection with U.S. Appl. No. 18/160,806, dated Jul. 25, 2023, 9 pages.
United States Patent and Trademark Office, "Non-Final Office Action," issued in connection with U.S. Appl. No. 14/751,684, dated Oct. 6, 2016, 17 pages.
United States Patent and Trademark Office, "Final Office Action," issued in connection with U.S. Appl. No. 14/751,684, dated Aug. 1, 2019, 17 pages.
United States Patent and Trademark Office, "Non-Final Office Action," issued in connection with U.S. Appl. No. 14/751,684, dated Sep. 17, 2019, 17 pages.
United States Patent and Trademark Office, "Final Office Action," issued in connection with U.S. Appl. No. 14/751,684, dated Mar. 18, 2020, 10 pages.
United States Patent and Trademark Office, "Ex Parte Quayle," issued in connection with U.S. Appl. No. 14/751,684, dated May 2, 2022, 9 pages.
United States Patent and Trademark Office, "Notice of Allowance and Fee(s) Due," issued in connection with U.S. Appl. No. 14/751,684, dated Aug. 31, 2022, 11 pages.
United States Patent and Trademark Office, "Examiners Answer to Appeal Brief," issued in connection with U.S. Appl. No. 14/751,684, dated Oct. 1, 2020, 15 pages.
United States Patent and Trademark Office, "Decision on Appeal," issued in connection with U.S. Appl. No. 14/751,684, dated Apr. 11, 2022, 7 pages.
United States Patent and Trademark Office, "Notice of Allowance and Fee(s) Due," issued in connection with U.S. Appl. No. 14/751,684, dated Feb. 8, 2023, 10 pages.
United States Patent and Trademark Office, "Supplemental Notice of Allowability," issued in connection with U.S. Appl. No. 14/751,684, dated Feb. 22, 2023, 2 pages.
United States Patent and Trademark Office, "Restriction Requirement," issued in connection with U.S. Appl. No. 14/751,684, dated Jun. 30, 2016, 15 pages.
United States Patent and Trademark Office, "Non-Final Rejection," issued in connection with U.S. Appl. No. 18/160,806, dated Jun. 29, 2023, 7 pages.
United States Patent and Trademark Office, "Notice of Allowance," issued in connection with U.S. Appl. No. 18/160,806, dated Jan. 3, 2024, 8 pages.

* cited by examiner

100

200

IMAGING FOR FOLDABLE DISPLAYS

CROSS REFERENCE TO RELATED APPLICATIONS

This patent arises from a continuation of U.S. patent application Ser. No. 14/751,684, which was filed on Jun. 26, 2015. U.S. patent application Ser. No. 14/751,684 claims the benefit of U.S. Provisional Patent Application No. 62/154,529, which was filed on Apr. 29, 2015. U.S. patent application Ser. No. 14/751,684 and U.S. Provisional Patent Application No. 62/154,529 are hereby incorporated by reference in their entireties. Priority to U.S. patent application Ser. No. 14/751,684 and U.S. Provisional Patent Application No. 62/154,529 is hereby claimed.

TECHNICAL FIELD

This disclosure relates generally to displaying images on a foldable display. More specifically, the disclosure relates to display interface options to save power and improve user experience on foldable displays.

BACKGROUND ART

Display devices can display images on panels from data provided to them. The data displayed on the panel is often generated by a processor and driven to a panel of the display using a video data channel. Some displays have multiple segments in an attempt to reduce cost of the display device.

BRIEF DESCRIPTION OF THE DRAWINGS

The following detailed description may be better understood by referencing the accompanying drawings, which contain specific examples of numerous features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
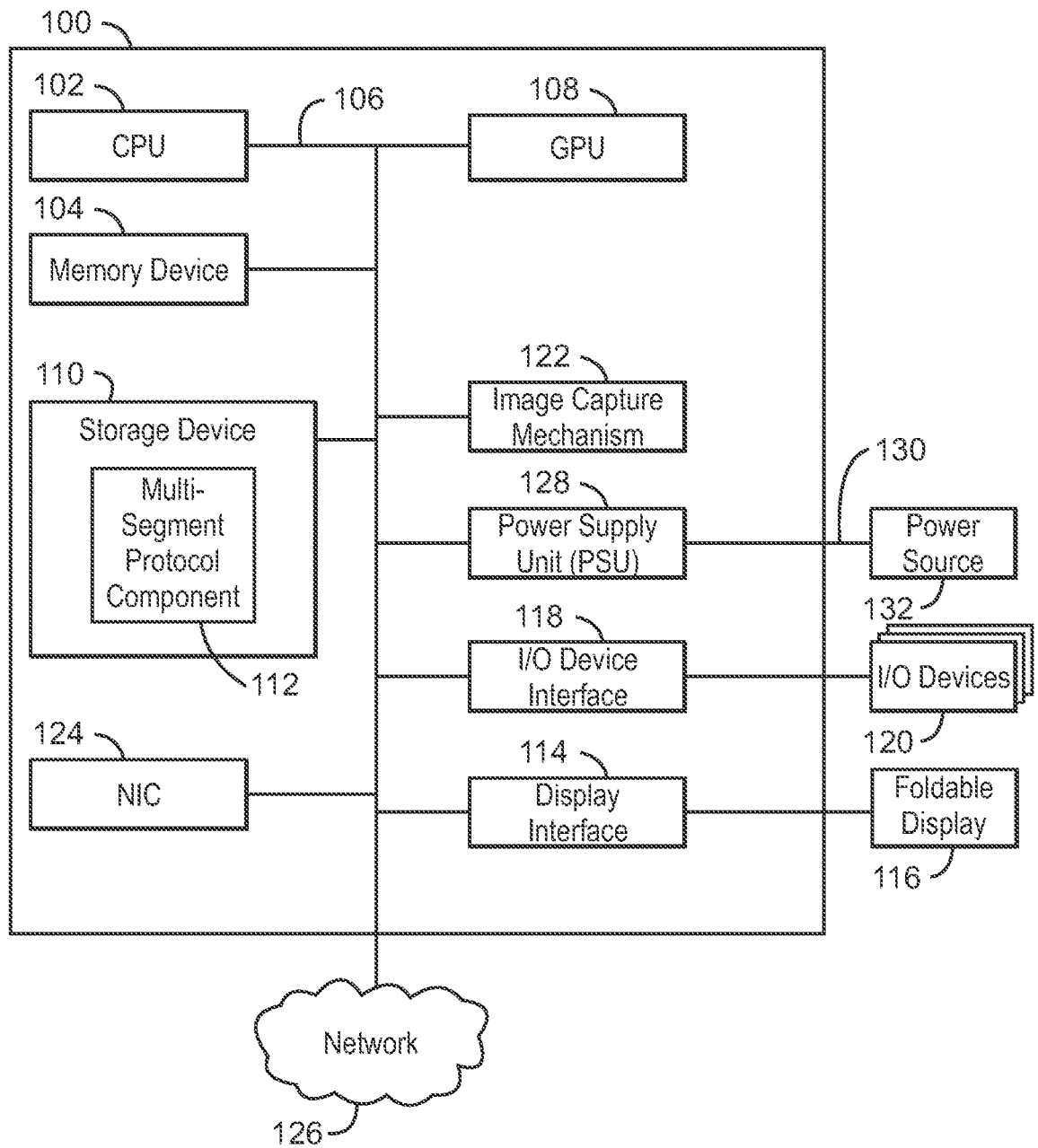
FIG. 1 is a block diagram of a system with a multi-segment protocol component to control images on a foldable display.

In display technologies that allow displays to flex or fold in certain ways could create the new use cases such as the ones described in this disclosure. These display segments are regions of the same panel that are separated by the foldable area of the display. A foldable panel could fold once resulting in a first segment and second segment on either side of the fold. A foldable panel that could fold twice, without the folds intersecting, could result in a first segment, second segment, and third segment.

Foldable panels resulting in multiple display segments can receive data in a number of ways to allow various image segments to be displayed appropriately on a single foldable display. Interfacing between a foldable panel and the GPU currently uses multi-single stream transport (SST) operation, also known as a multi-SST operation (MSO), implemented on multiple DisplayPort (DP) ports, or uses a single embedded DisplayPort (eDP) port. Some embodiments the display interface and controllers of the display may not be embedded. MSO supports either two or four segments of a panel, where each segment is driven by either one or two lanes of a single eDP port. In one example, the MSO uses 2×1, 2×2, or 4×1 configurations, representing the number of segments and the number of lanes in a port for driving each segment, respectively.

In the present disclosure, a platform features two folds and three display segments on the panel of the display. To accommodate the two-fold platform, a new multi-segment protocol (MSP), is disclosed to control the images displayed on the multiple segments. In some embodiments MSP is implemented using MSO enabled on display interface ports including, for example, eDP or DP. MSP can also be implemented with mobile industry processor interface (MIPI) display interfaces as well as other display interfaces. Indeed, the examples, mappings, techniques, and methods discussed for MSO can also be applied to MIPI panels, as the concepts of the MSO extensions can be used as MIPI extensions as well. In an example, MIPI may not have link training. However, the techniques of MSP is port and standard independent.

In some examples, the two folds of the platform result in at least three segments, a center segment, a left segment, and a right segment. The left segment and right segment can be seen as wings of the platform that can be folded by the user. The folding or unfolding operations result in several operational modes on the platform including a full tablet display mode and a "partial" tablet display mode where one segment is folded. Other examples include a two screen tablet, and a fully folded platform where both segments are folded to close view of the panel, and a fully folded open platform to act as a phone or phone/tablet i.e. "phablet." Other examples include a tablet with display panels on both sides of the tablet such that if the wings of the tablet are folded down, screens from the back of the panel are now viewable from the front. Other examples include tablets with segments of varied, rather than equivalent, length and shape in any combination. In some examples, the folding of segments of the tablet can block view of a portion of a second segment of the tablet. Each of the above modes shows examples of the flexibility enabled with a three segment foldable screen, as well as the control that may be exerted by an interface implementing the configuration disclosed herein. Other configurations and modes are possible as the folds can move forward and backwards, and the panels can alternate in display and orientation as desired and instructed. The present disclosure further shows a method of displaying images in the various operational modes discussed above and enabled by MSP. The figures below illustrates a few of the configurations enabled by MSP as well as the operational modes enabled by MSP in a three segment panel.

An image being displayed on a multi-segment panel is incompletely shown if portions of the panel are folded to obscure the image. This simple obscuring by folding clips the view of the image, similar to an image crop, after the segments are folded to render an image display non-operative or nonvisible. In the present disclosure, methods and techniques are disclosed to adjust the image using aspect ratio scaling based on fold events and other sensors of a device such as orientation sensors. This aspect ratio scaling can improve the user experience (UX) during transitions of a foldable panel as well as through rotation of the entire foldable panel.

FIG. 1 is a block diagram of a system with a multi-segment protocol component to control images on a foldable display. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics functions and actions within the computing device 100. For example, the GPU 108 may be configured to render or manipulate graphics images, graphics frames, videos, or the like, to be displayed to a user of the computing device 100.

The computing device 100 may also include a storage device 110. The storage device 110 is a physical memory such as a hard drive, an optical drive, a thumb drive, an array of drives, or any combinations thereof. The storage device 110 can also include remote storage drives. The storage device 110 can include a multi-segment protocol (MSP) component 112. The MSP component 112 can be utilized by the CPU 102 or the GPU 108 to control a display interface 114 and effect the images shown on a foldable display 116. A foldable display can fold backwards and forwards and can involve a range of motion including slights folds and also large range of motion folds. In one example, the foldable display 116 is a two-fold foldable display resulting in three segments which can each have the same display area or varied dimensions. In various embodiments the MSP component can be used to control how a foldable display 116 displays not only images but also frames, videos, or other similar visibly detectable objects to be displayed to a user of the computing device 100.

The CPU 102 may be linked through the bus 106 to a display interface 114 configured to connect the computing device 100 to one or more display devices 116. In an example the display interface 114 can include a DisplayPort (DP) interface, an embedded DisplayPort (ePD) interface, or a MIPI interface. In an example, regardless of the technology used, one or several display ports can be used with the display interface 114. The display device(s) 116 may include a display screen that is a built-in component of the computing device 100. Examples of such a computing device include mobile computing devices, such as cell phones, tablets, 2-in-1 computers, notebook computers or the like. The display device 116 may also include a computer monitor, television, or projector, among others, that is externally connected to the computing device 100.

The CPU 102 may also be connected through the bus 106 to an input/output (I/O) device interface 118 configured to connect the computing device 100 to one or more I/O devices 120. The I/O devices 120 may include, for example, a keyboard and a pointing device, wherein the pointing device may include a touchpad or a touchscreen, among others. In an example, these I/O devices can also include sensors to detect a fold event generated by the folding of a segment of a foldable display 114. In an examples the sensors can be incorporated into the computing device 100 or the foldable display 114 itself and can indicate the direction of folding, the extent of folding, and the specific segment being folded. The I/O devices 120 may be built-in components of the computing device 100, or may be devices that are externally connected to the computing device 100. The sensors used is I/O devices 120 can also include light sensors, direction sensors, and any other sensors suitable for indicating a direction and positional configuration and folding arrangement of the foldable display 114. The computing device 100 includes an image capture mechanism 122. In some embodiments, the image capture mechanism 122 is a camera, stereoscopic camera, scanner, infrared sensor, or the like.

The computing device 100 may also include a network interface controller (NIC) 124 may be configured to connect the computing device 100 through the bus 106 to a network 126. The network 126 may be a wide area network (WAN), local area network (LAN), or the Internet, among others.

The computing device 100 and each of its components may be powered by a power supply unit (PSU) 128. The CPU 102 may be coupled to the PSU through the bus 106 which may communicate control signals or status signals between then CPU 102 and the PSU 128. The PSU 128 is further coupled through a power source connector 130 to a power source 132. The power source 132 provides electrical current to the PSU 128 through the power source connector 130. A power source connector can include conducting wires, plates or any other means of transmitting power from a power source to the PSU.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
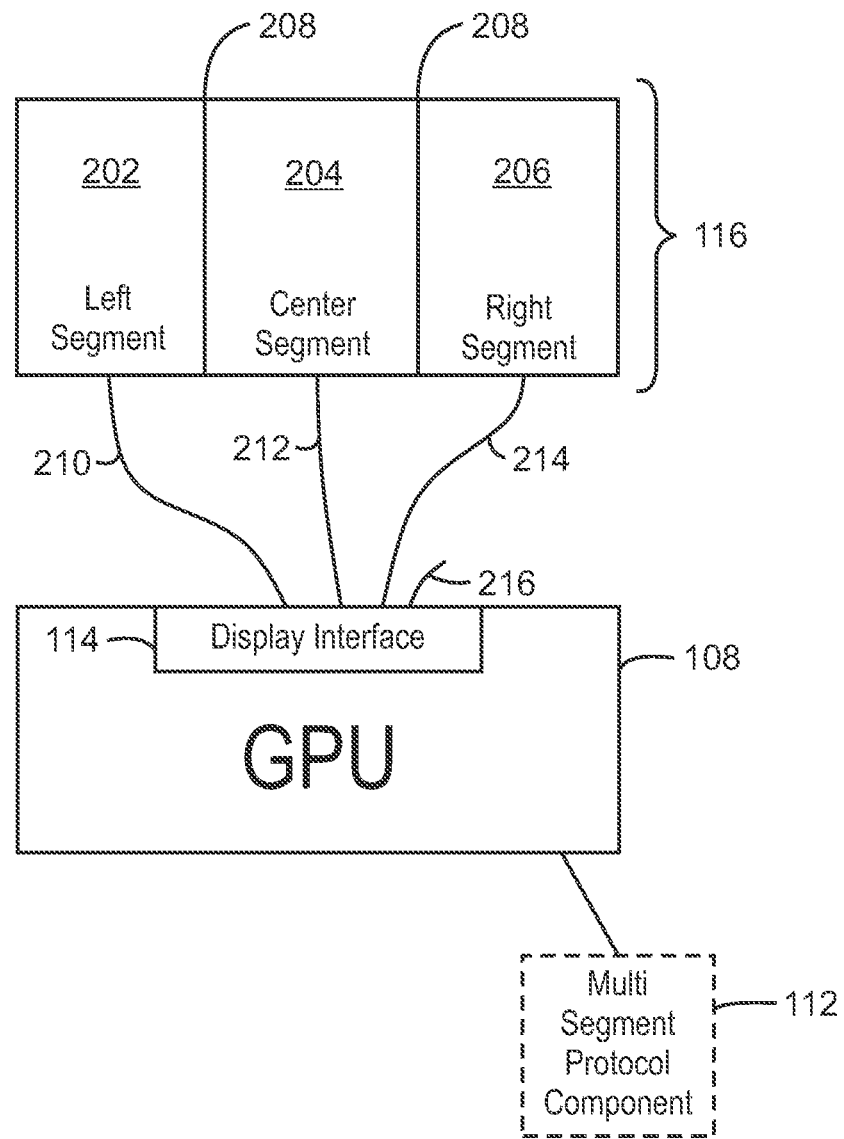
FIG. 2 is a block diagram of a display interface lane mapping to a foldable panel controlled by a multi-segment protocol component.

FIG. 2 is a block diagram of a display interface lane mapping 200 to a foldable panel 116 controlled by a multi-segment protocol component 112. Like numbered items are as described in FIG. 1. The foldable display 116 shown includes three segments: a left segment 202, a center segment 204, and a right segment 206. These segments are each created by a fold 208 in the foldable display 116 while shown here as being equally sized and symmetrical other examples can vary in their arrangement, sizing, and number.

In some examples, the display interface 114 can include four lanes which can also be known as channels. The lanes can be wires, optical fibers, or any other means of communicating data from a processor like a GPU 108 to a foldable display 116. In some examples, the display interface can include a lane-0 210, lane-1 212, lane-2 214, and lane-3 216.

Depending on the type of detected foldable display 116, and the detected display interface 114, a multi-segment protocol (MSP) component 112 can map lane-0 210 to the left segment 202, lane-1 212 to the center segment 204, and lane-2 214 to the right segment. The MSP component 116 using the GPU 108 can instruct a display interface 114 to drive image data separately to each of the three segments of the foldable display 116. In an example, the fourth lane, lane-3 216, can be left inactive or unmapped to any segment of the display of the foldable device 116.

In one example, the control by the multi-segment protocol component 112 can uses a multi-SST operation (MSO) and a four lane display interface 114. In this example, three segments of an embedded display port (eDP) panel can be driven by three lanes each connected to a single eDP port with one lane remaining unused.

In one example, definitions in the DisplayPort Configuration Data (DPCD) registers can be enhanced. A MSO_LINK_CAPABILITIES register (0x7a4), and a NUMBER_OF_LINKS field can be set to the value 0x3. The MSO_LINK_CAPABILITIES>INDEPENDENT_LINK_BIT continues to be set to 0x0 indicating one extended display identification data (EDID) timing driving the three segments of the foldable display 116. In an example, the display port (DP) source, such as the GPU 108, uses lanes 0, 1 and 2 to drive the three panels of the foldable display 116, with the fourth lane not driving any segments. During link training, the GPU can train only lanes that are connected to segments, using a procedure of the DP to identify these connected lanes. In an example, after successful link training, the GPU can drive a portion of the displayable image on lane-0 210 to the left segment 202, a second portion of the displayable image to the middle segment 204 on lane-1 212, and a third portion of the displayable image to the right segment 206 on lane-2 214.

In the example where only one display interface 114 is used, the panel has a common auxiliary (AUX) channel block for all three segments, so the GPU 108 receives a single extended display identification data (EDID) usable to ensure the timing of one of these three segments is applicable to all three of the segments. In an example, if each segment has a resolution of 600×900 (collectively giving a panel of a foldable display 116 a resolution of 1800×900), the EDID only has the timing details for the 600×900 resolution. As discussed above, a variety of sizes can also be used with similar mappings and suitable resolutions and images transmitted to each.

Figure 3:
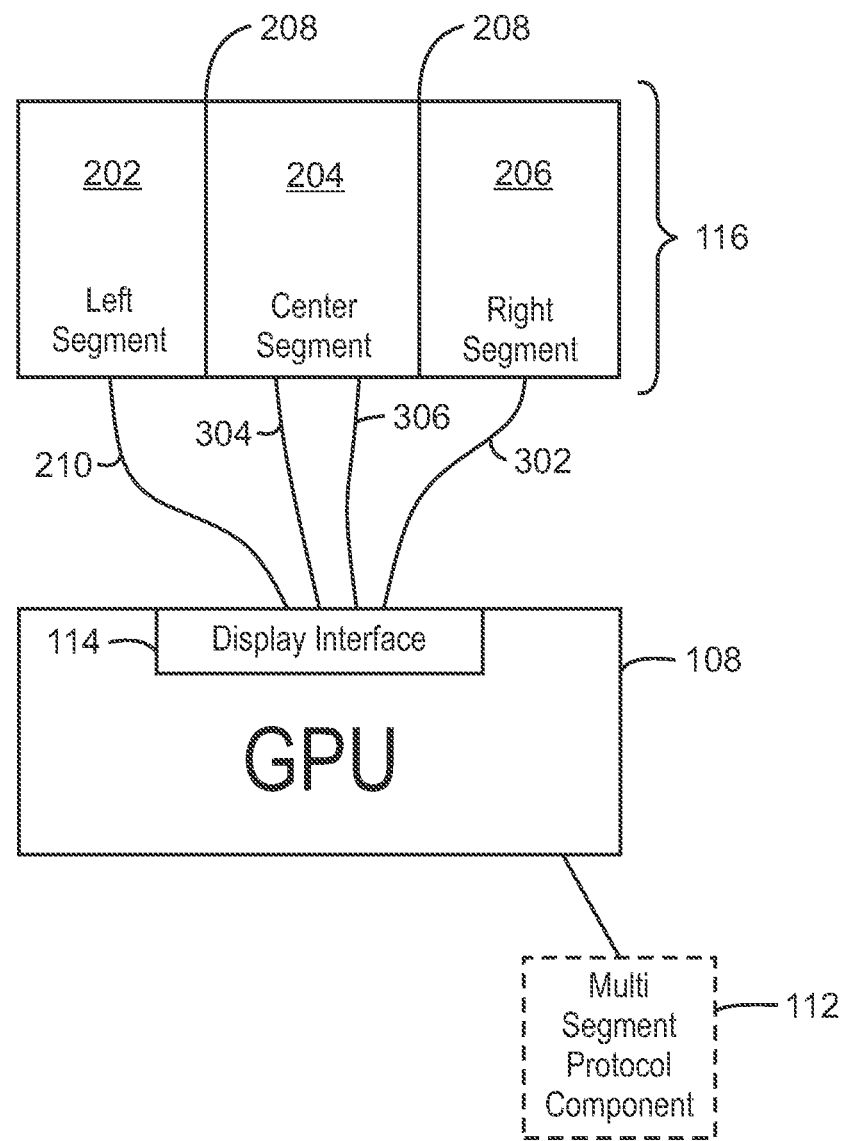
FIG. 3 is a block diagram of a display interface mapping with pairable lanes to a foldable panel controlled by a multi-segment protocol component.

FIG. 3 is a block diagram of a display interface mapping with pairable lanes 300 to a foldable panel 116 controlled by a multi-segment protocol component 112. Like numbered items are as described in FIG. 1 and FIG. 2.

In some examples, the display interface 114 can include four lanes which can each be paired together to send data to the same segment if it is detected that two lanes are paired. For example, a multi-segment protocol (MSP) component 112 can map lane-0 210 to the left segment 202, lane-3 302 to the right segment 206, and both lane-1 304 and lane-2 306 to the center segment 204. In this example, lane-1 and lane-2 would be paired and can both send data to the center segment 204. While in the shown example, the lanes are paired and connected to the center segment 204, any pairing combination to any segment can be mapped by the MSP component 116 so long as each segment receives data from at least one lane of the display interface 114.

In one specific example using this mode of operation, three segments of the foldable display 116 connected to a display interface 114, such as an eDP, receive data driven by four lanes of the display interface 114. This example leads to an uneven distribution of lanes over panel segments when there are three segments in the display. Here, two segments are driven by one lane each, while one lane is driven by two lanes. To support this, the multi-segment protocol component 116 enhances the registers by redefining and adding to the DisplayPort Configuration Data (DPCD). In one example, in a MSO_LINK_CAPABILITIES register (0x7a4), a NUMBER_OF_LINKS field is set to the value 0x3. The MSO_LINK_CAPABILITIES>INDEPENDENT_LINK_BIT is set to 0x1 indicating that each link is independent in the sense that different EDID timings are used for such a configuration. A currently reserved Bit4 of the MSO_LINK_CAPABILITIES register can be defined as MSO_ASYMMETRIC_SEGMENTS, and this value is set to 0x1 to indicate 3xn MSO configuration. In an example, the multi-segment protocol component 116 controls a GPU 108 to provide data to the display interface 114 using four lanes to drive the three panels.

In some examples, during link training, the GPU 108 trains all four lanes that are connected, using link training procedures typically used for the display interface 114. If link training is successful, the GPU 108 can drive the left third of an image on lane-0 210 to the left segment 202, the middle third of the image on lane-1 304 and lane-2 306, and the right third of the image on lane 3 302. In an example, the panel mapped using paired lanes continues to have a common AUX channel block for all the segments, so the GPU 108 receives a single EDID. In an example, the EDID can contain the timing for the two of the segments that have the same resolution. So if two of the three segment has a resolution of 600×900, the EDID only has the timing details for this 600×900 resolution. Timing details for the third segment's resolution can be captured in a newly created set of DPCD registers that contain one instance of detailed timing descriptor usually contained in the EDID.

As the example shown in FIG. 3 uses additional lanes of the display interface 114 when compared to the example in FIG. 2, additional power is used to achieve the same visual effect. However, the mapping controlled by the multi-segment protocol component 112, in this example, provides a way to drive different resolutions on the three segments—in particular, this separation enables the driving of a larger resolution on one of the three segments. In the example where two lanes drive one of the segments, the center segment 204 can potentially support twice the resolution supported by each of the other wings.

Figure 4:
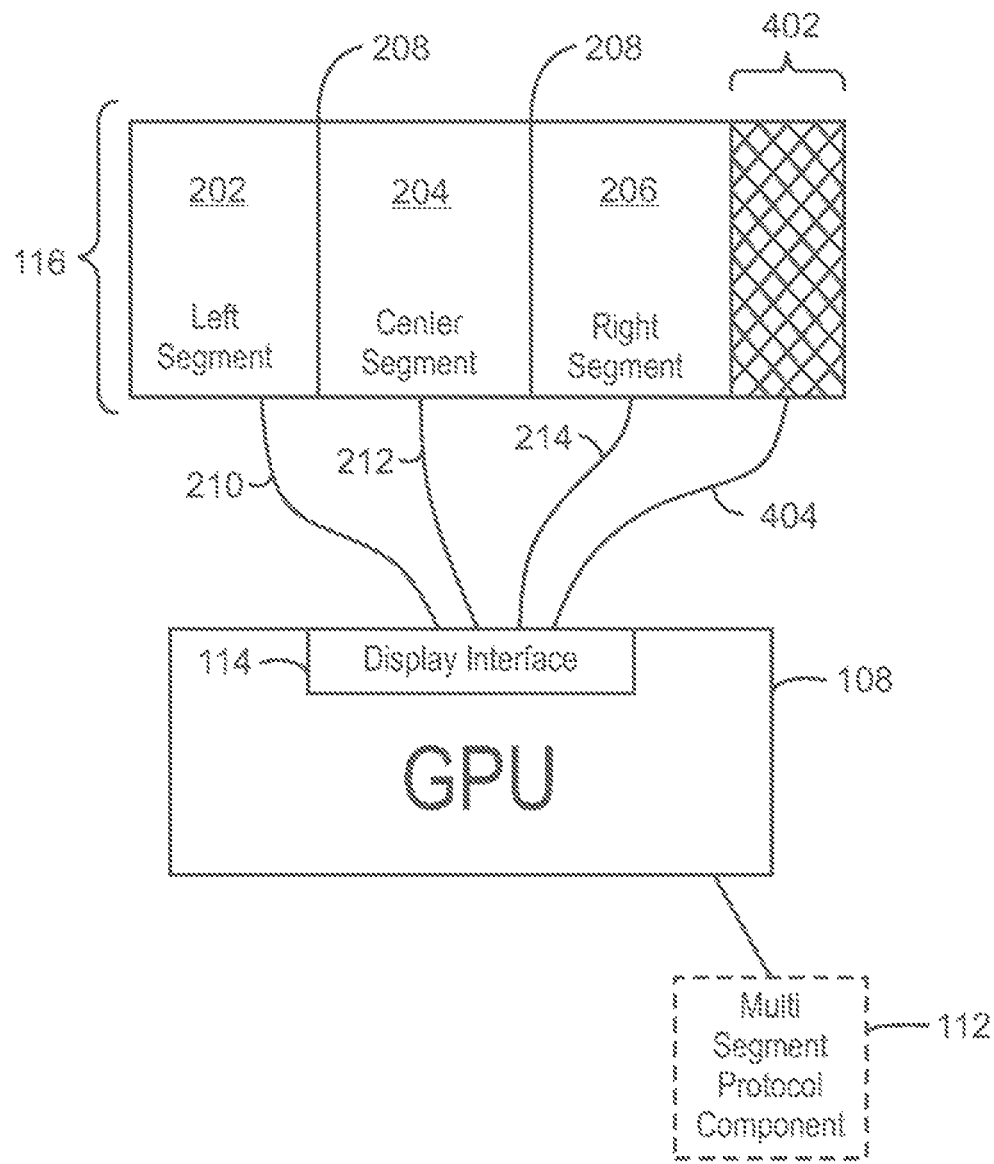
FIG. 4 is a block diagram of a display interface lane mapping to a foldable panel and virtual segment controlled by a multi-segment protocol component.

FIG. 4 is a block diagram of a display interface lane mapping to a foldable panel 116 and virtual segment 402 controlled by a multi-segment protocol component 112. Like numbered items are as described in FIG. 1, and FIG. 2.

A multi-segment protocol component 112 can instruct a display interface source like the GPU 108 to map a lane to a virtual segment 402. A virtual segment 402 may appear to an operating system of a computer 100 as a separate segment of the foldable display 116, however the virtual segment 402 is purely virtual and is not displayed. In one example, the multi-segment protocol component 116 can map a fourth lane, here lane-3 404, to map to the virtual segment 402 in effect mapping to a non-visible segment.

In one example, the multi-segment protocol component can enhance a definition in the DisplayPort Configuration Data (DPCD) registers. These enhancements can include setting the field of NUMBER_OF_LINKS in the MSO_LINK_CAPABILITIES register (0x7a4) to the value 0x4. Further, MSO_LINK_CAPABILITIES>INDEPENDENT_LINK_BIT can be set to 0x0 indicating that each link is independent in the sense that different EDID timings are used for such a configuration. MSO_LINK_CAPABILITIES>MSO_ASYMMETRIC_SEGMENTS can be set to 0x1. Currently reserved Bit5 of the MSO_LINK_CAPABILITIES register can be defined as MSO_VIRTUAL_SEGMENT, and this value is set to 0x1 to indicate v3x1 MSO configuration.

In an example, the GPU 108 uses the four lanes of the display interface 114 to drive the four segments, one of which happens to be virtual: lanes 0, 1, and 2 drive the left segment 202, center segment 204, and a right segment 206 respectively, while lane 4 drives the virtual fourth segment 402. The GPU 108 can train all four lanes using typical display interface 114 methodologies. In an example, a panel timing controller (T-CON) can respond with locking status for all four lanes. Upon successful completion of link training, the display driver on the GPU 108 can split the foldable display 116 into three parts and drive relevant image sections to them onto lanes 0, 1, and 2 respectively. On the fourth lane, the GPU 108 can either replicate one of the image segments, transmit hardcoded blank pixels, or transmit any data or lack of data as it can all be ignored by the T-CON as it is not to be displayed. In one example, this can be accomplished by the foldable display 116 connected to all four lanes and the foldable display's T-CON firmware supporting the fourth lane for link training while not driving as there is no real panel for this fourth segment 402. In an example, the virtual segment 402 is not fourth, but in any virtual location.

Figure 5:
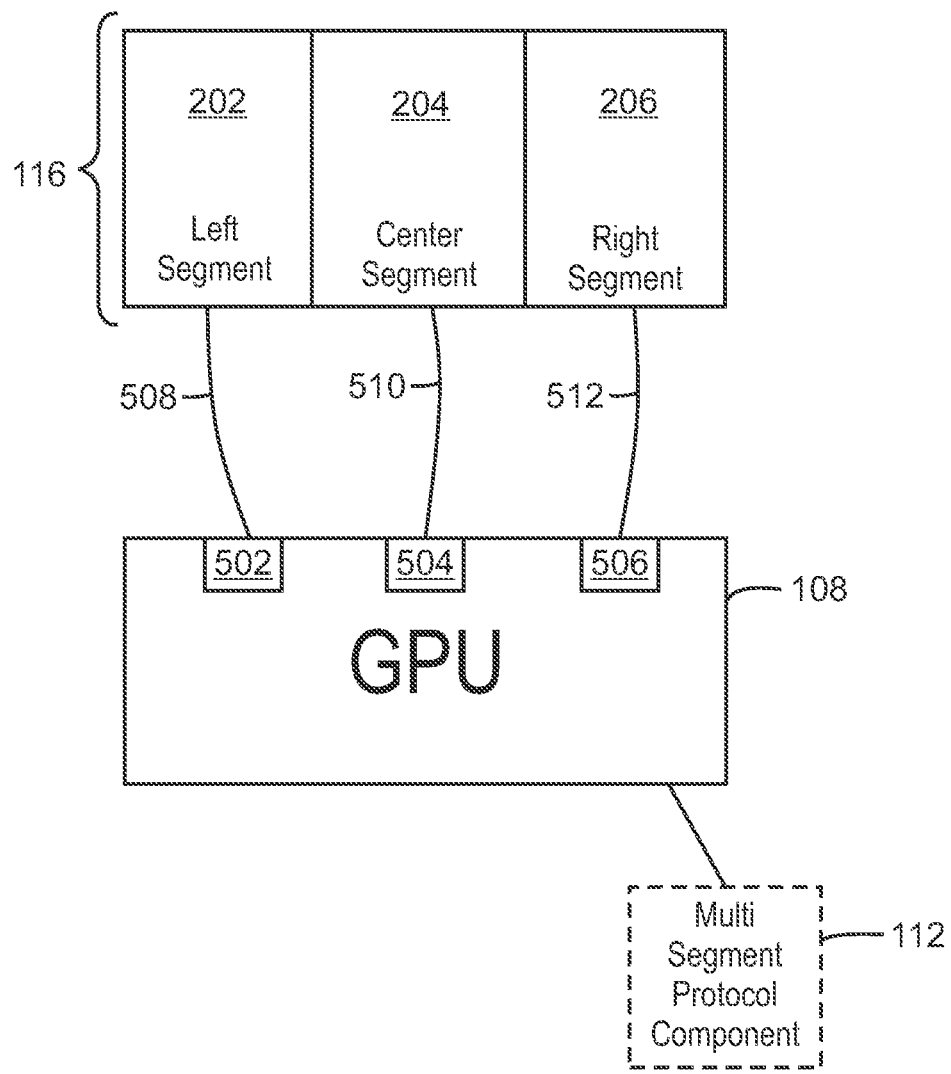
FIG. 5 is a block diagram of multiple display interfaces mapped to a foldable panel controlled by a multi-segment protocol component.

FIG. 5 is a block diagram of multiple display interfaces mapped 500 to a foldable panel 116 controlled by a multi-segment protocol component 112. Like numbered items are as described for FIG. 1 and FIG. 2.

In some examples, computing device 100 and GPU 108 may not include a display interface 114 capable of mapping lanes to different segments. As one example of an alternative, FIG. 5 shows a GPU 108, directed by the MSP component 116, driving a first port 502 connected to the left segment 202 by a first lane 508, second port 504 connected to the center segment 204 by a second lane 510, and third port 506 connected to the right segment 206 by a third lane 512. Each of these ports may be similar to the display interface 114, except they may be unable to map lanes to various segments of a foldable display 116. In one example, each of the ports is a display port (DP), an embedded display port (eDP), or another suitable interface to transmit data from a processor such as a GPU 108 to a panel or display, such as the foldable display 108.

In an example, rather than dividing lanes among segments, a GPU 108, directed by the MSP component 116, can map a first port 502 to the left segment 202, a second port 504 to the center segment 204, and the third port 506 to the right segment 206. Techniques for displaying images can proceed as discussed herein including the division of images between segments. Further, in cases where DP ports are used, each independent port have its own AUX channels and EDID—one for each segment.

When compared to examples using only one port, systems using three ports can consume more power as a different power drawing pipeline is used for each port in the GPU 108 to display different images in each segment.

In an example, the GPU may only use one standard eDP or MIPI port without using MSO, any combination of ports is herein contemplated. Software management of a driven image to a foldable panel 108 can make it appear as though three segments of a foldable display 116 are separately driven.

Each of these examples can affect the way a user experience (UX) of viewing images on a device with a foldable display 116 is managed. The UX can also be affected by the extent of responsibility that is split with the Operating System. For example, if a foldable display 116, such as a panel using MSO is used in one of the configurations for a two-fold display as described above, system software can turn off content to the folded segments by using fewer lanes. Content of the frame buffer can be split between one, two, or three segments depending on the number of segments folded back or forward. In one example, segments that are folded back can be automatically displaying black or nothing since they are not driven.

As implemented in examples seen in FIG. 5, when three ports are used, such as DP ports, folded segments may also simply not be driven by deactivation or un-activation of the respective ports. In examples, where the foldable display 116 interfaces with a single display interface 114, such as an eDP or MIPI port, system software may not have the option of simply not driving the segments that are folded back or forward, as it drives the entire panel (all three segments) or none of them. Instead, software can explicitly manage UX, in these single port, non-lane mapped examples, by creating an illusion that folded segments are not driven. In one example, this can be done by transmitting black pixels to the portion of the frame buffer corresponding to the folded segments. Depending on the device, this can also involve software that manages not only folding but also rotation, partial folding, or any other manipulation of the foldable display.

Figure 6:
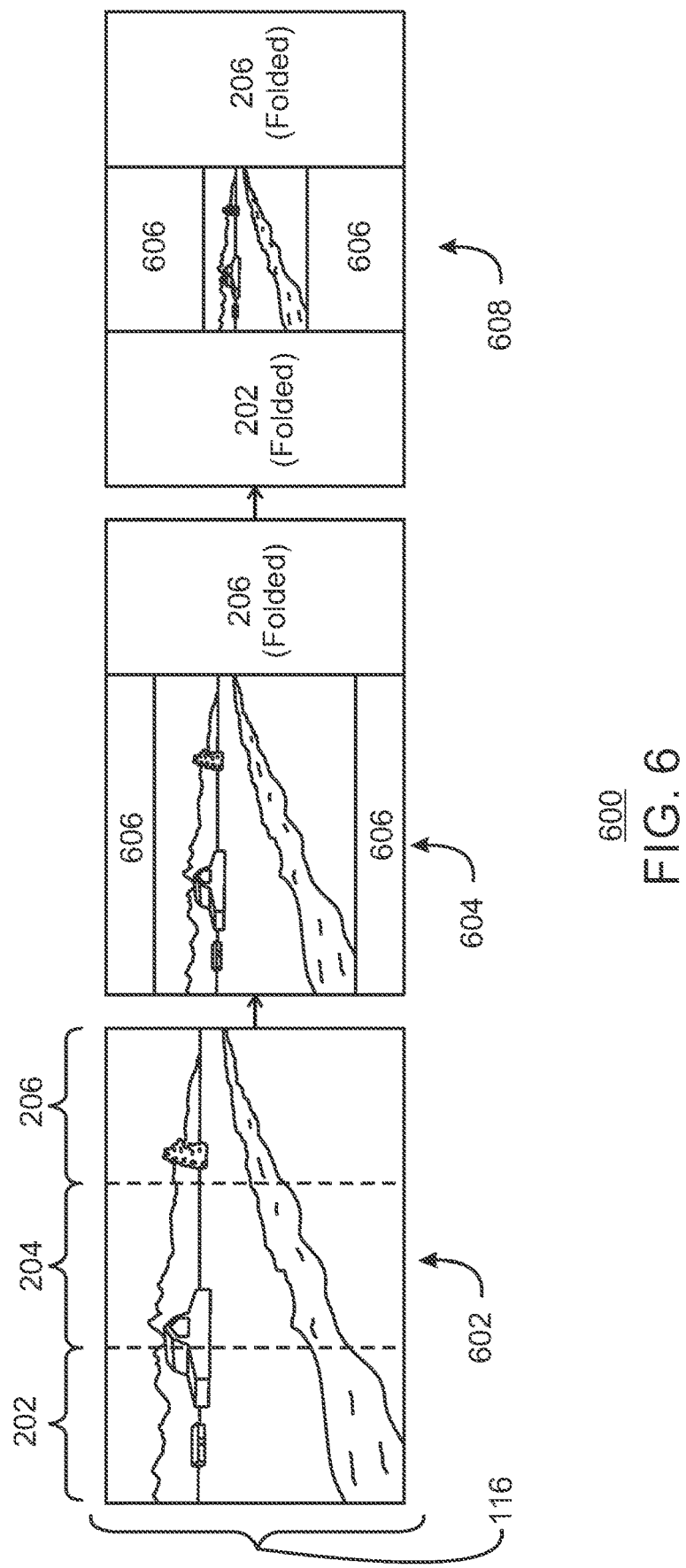
FIG. 6 is a block diagram showing an example series of the image displayed on a foldable display as the foldable device folds while instructed by a multi-segment protocol component.

FIG. 6 is a block diagram showing an example series 600 of the image displayed on a foldable display 116 as the foldable device folds while instructed by a multi-segment protocol component 112. Like numbered items are as described in FIG. 1 and FIG. 2.

Item 602 can show a fully unfolded foldable display 116. Item 604 can show a foldable display 116 with a right segment 206 folded back or forward completely and no longer showing a visible display or panel. The landscape video shown in 602 can be re-mapped to fit the new display area visible and resulting from the one fold. In some examples, to maintain proper aspect ratio of the original image, letter box 606 techniques can be used. Letter boxing 606 can include the blacking out or non-display of portions of an otherwise active display on the vertical borders of an image to be displayed. In an example item 604 shows letter boxing above and below to the image in the displayable image area.

Item 608 can show a foldable display 116 with a right segment 206 and a left segment 202 folded back, forward completely and no longer viewable. The landscape video shown in item 602 can be re-mapped to item 608 having two folds. To manage the illusion of a portrait display, after one or two folds, and in order to maintain proper aspect ratio scaling, software executed with an operating system or with the MSP component 112 may introduce both pillar boxing and letter boxing, or simulate aspect ratio scaling after simulating a fold.

Figure 7:
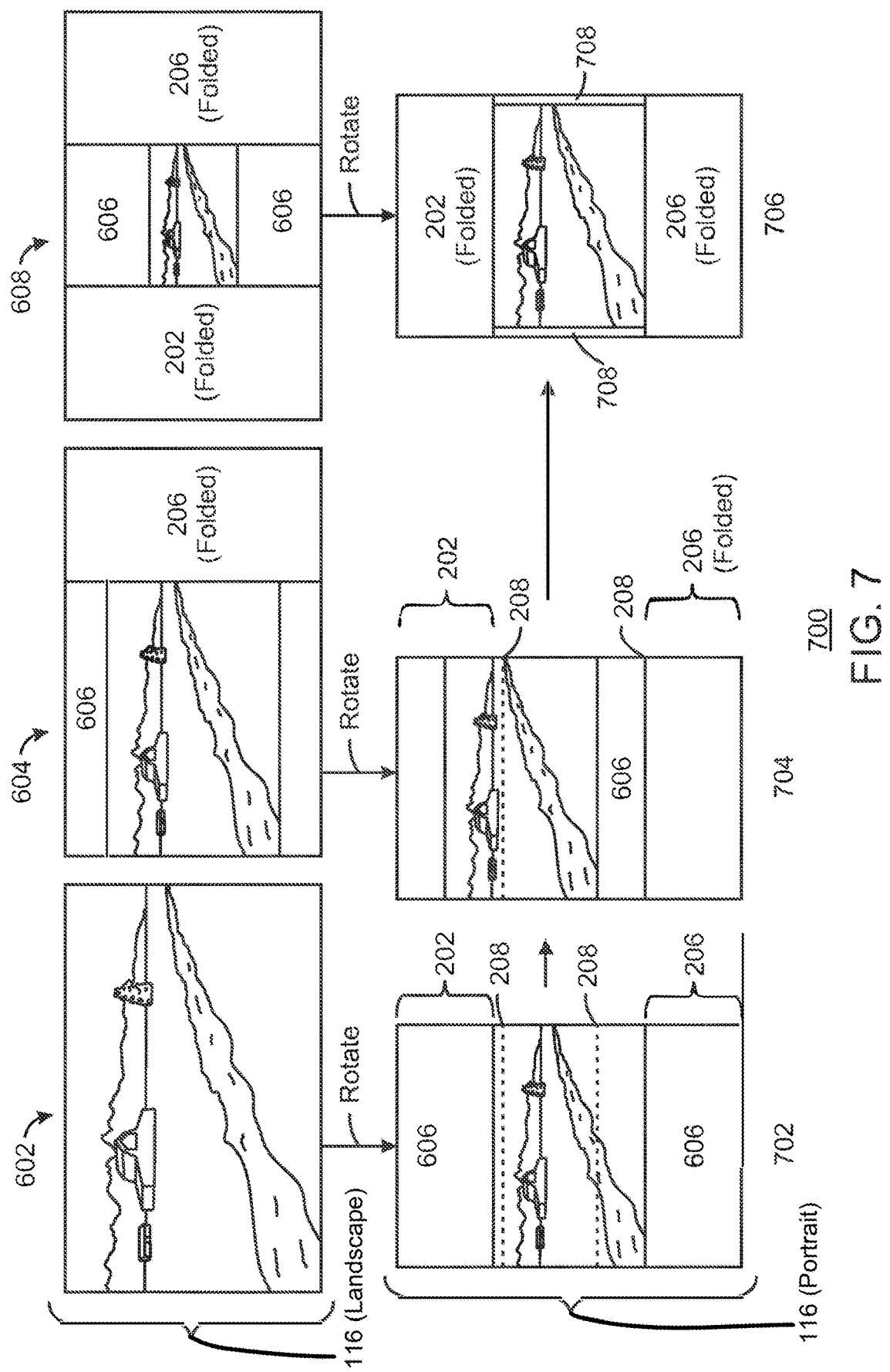
FIG. 7 is a block diagram showing an example series of the image displayed on a foldable display as the foldable device folds while instructed by a multi-segment protocol component.

FIG. 7 is a block diagram showing an example series 700 of the image displayed on a foldable display 116 as the foldable display folds while instructed by a multi-segment protocol component 112. Like numbered items are as described in FIG. 1, FIG. 2, and FIG. 6.

Item 702 can show a fully unfolded foldable display 116 rotated to a portrait view. Item 704 can show a foldable display 116 with a right segment 206 folded back or forward while the foldable display 116 is rotated into a portrait view. The landscape video shown in 602 can map to item 604 on one fold in portrait view.

Item 608 shows a foldable display 116 with a right segment 206 and a left segment 202 folded back or forward while the foldable display 116 is rotated into a portrait view.

As before, to maintain an aspect ratio letter boxes 606 and pillar boxes 709 can be used. Pillar boxing 708 can be similar to letter boxing 606 as both include the non-display or blacking out of regions on the edge of images. Pillar boxing 708 refers to the left and right edges of an image, rather than the top and bottom.

Item 602 shows a tablet mode, 604 shows a partially folded tablet mode that is achieved when the right segment 206 is folded back or forward, and 608 shows a phone mode when both the right segment 206 and left segment 202 are folded back or forward.

On a 90 degree clockwise rotation, as seen in 702, 704, and 706 the above images are driven by system software to project an illusion that folded segments are not driven. As discussed above, in order to maintain proper aspect ratio scaling, instructions executed by an operating system or by the MSP component 112 can introduce both pillar boxing 708 and letter boxing 606, or simulate aspect ratio scaling after simulating a fold.

One variant in 604 and 608 examples is the second screen or multi-screen scenario, where the folded wing shows a second, independent screen to the end user on the side opposite the panel. This example describes a case where a segment may be folded back and continue to display an image segment rather than go black. This example can have the effect of having a second screen to display the same image in coordination with the previously displaying screens or it can also display an entirely different image. While these operational modes are common, many other combinations of folding of the folding display 116 are contemplated and can be likewise actuated through use of driving the image and display segments by the various methods discussed above.

Figure 8:
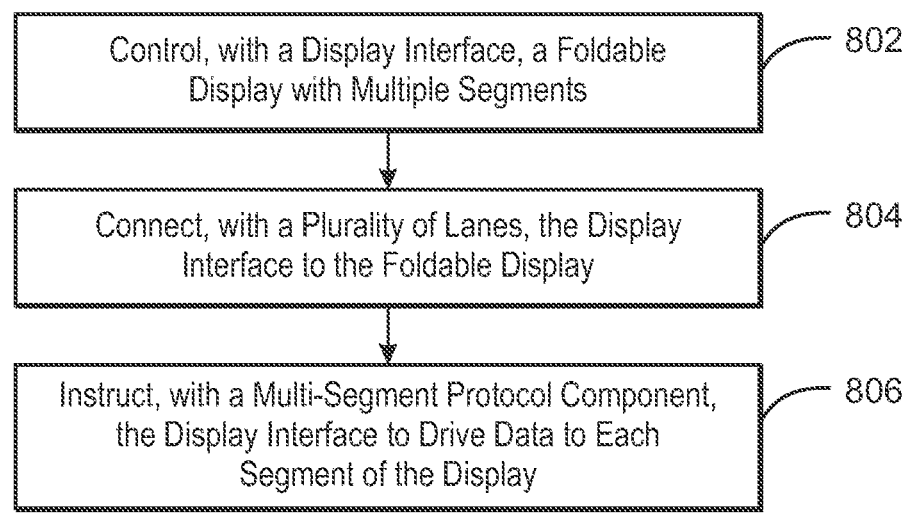
FIG. 8 is a block diagram showing an example method for driving data through multiple lanes to segments of a foldable display.

FIG. 8 is a block diagram showing an example method 800 for driving data through multiple lanes to segments of a foldable display. The process begins at block 802.

At block 802, a foldable display with multiple segments is controlled with a display interface. The foldable display can be a single display with foldable properties allowing folding of an otherwise solid device along fold lines. The foldable device can include three segments created by two fold lines. The segments can be equally sized and shaped, when compared to one another, or may vary in any dimension.

At block 804, the display interface is connected to the foldable display with a plurality of lanes. In an example, the display interface can be connected in a variety of configurations. In an example, the lanes can each correspond to one segment and any extra lanes being non-active or disconnected. In another example, the lanes can be grouped, two or more to a segment, in order to ensure every lane is assigned a segment of the foldable panel. In another example, a lane is connected to a virtual segment of the foldable display.

At block 806, a multi-segment protocol component instructs the display interface to drive data to each segment of the display. The data driven is can be image data, video data, black-out or blank data, and data to power off a particular display area or segment. In an example, the data driven can result in the unpowering of a portion of display segment of the foldable display, the entire segment, or the entire foldable display. In an example, the image and video data can alter based on the detection of a fold event by the multi-segment protocol component. For example, if a fold event is detected, folded over segment can be blocking the view of the displayed image. In this example, the data driven is altered and adjusted between the remaining two segments so that the image continues to be shown—and also the aspect ratio is preserved such that the full size of the image displayed can change in order to accommodate the area of the display that is now visible. Similarly, in an example, if an orientation of the foldable display is altered, the multi-segment protocol component can instruct the display interface to drive data to the foldable display reflecting the new orientation of the display device.

Example 1

In an example a processing unit can include a display interface to control a foldable display with multiple segments created by fold lines in the foldable display. The example can also include a number of lanes to connect the display interface to the foldable display, where each segment of the foldable display can be connected to a lane. The example can also include a multi-segment protocol component to instruct the display interface to drive data to each segment of the display through the number of lanes. In a version of the example, one of the lanes can be connected to an additional segment of the foldable display that can be a virtual segment. Further, one of number of lanes can be disconnected from a segment of the foldable display. In another example, a segment of the foldable display is connected to multiple lanes. This example can further include a number of display interfaces wherein each of the number of lanes connects to a different display interface. The multi-segment protocol component can, in some cases, detect a fold event when a segment is folded and instructs the display interface to drive data based on the detected fold event. In an example, the multi-segment protocol component detects when the foldable display is altered in orientation and instructs the display interface to drive data based on the detected altering of orientation. In an example, the multi-segment protocol component detects a partial fold event and instructs the display interface to drive data based on the detected partial fold event. This example can further include the detection of a fold event and instructing of the display interface to stop driving data to a segment based on the detected fold event. In an example, the foldable display includes a display panel on the opposite side of a segment of the display that receives power and driven data only when instructed by the multi-segment protocol component based on a detected fold event.

Example 2

In an example, a method for displaying an image on a two-fold foldable display can include controlling, with a display interface to, a foldable display with multiple segments created by fold lines in the foldable display. This example can also include connecting, with a number of lanes, the display interface to the foldable display, where each segment of the foldable display is connected to a lane. In an example, the method can also instruct, with a multi-segment protocol component, the display interface to drive data to each segment of the display through the number of lanes. This example can also include detecting a fold event when a segment is folded and instructing the display interface to drive data based on the detected fold event to maintain aspect ratio in the remaining visible area of the foldable panel. In an example, the method can also include detecting when the foldable display is altered in orientation and instructing the display interface to drive data based on the detected altering of orientation. An example method can also detect a partial fold event and instruct instructing the display interface to drive data based on the detected partial fold event. The example method can also detect a fold event and instructing the display interface to stop driving data to a segment based on the detected fold event.

Example 3

In an example, a tangible, computer-readable medium to store instructions that when executed by a processor can cause an apparatus to control, with a display interface to, a foldable display with multiple segments created by fold lines in the foldable display. This example can also connect, with a number of lanes, the display interface to the foldable display, where each segment of the foldable display is connected to a lane. This example can also include instructing, with a multi-segment protocol component, the display interface to drive data to each segment of the display through the number of lanes. In a version of the example, one of the lanes can be connected to an additional segment of the foldable display that can be a virtual segment. Further, one of the number of lanes can be disconnected from a segment of the foldable display. In another example, a segment of the foldable display is connected to multiple lanes. This example can further include a number of display interfaces wherein each of the number of lanes connects to a different display interface. The multi-segment protocol component can, in some cases, detect a fold event when a segment is folded and instructs the display interface to drive data based on the detected fold event. In an example, the multi-segment protocol component detects when the foldable display is altered in orientation and instructs the display interface to drive data based on the detected altering of orientation. In an example, the multi-segment protocol component detects a partial fold event and instructs the display interface to drive data based on the detected partial fold event. This example can further include the detection of a fold event and instructing of the display interface to stop driving data to a segment based on the detected fold event. In an example, the foldable display includes a display panel on the opposite side of a segment of the display that receives power and driven data only when instructed by the multi-segment protocol component based on a detected fold event.

Example 4

In an example, a system for displaying images on a foldable display includes a processor, a foldable display with multiple segments created by fold lines in the foldable display, a display interface to control the foldable display, and a plurality of lanes to connect the display interface to the foldable display, where each segment of the foldable display is connected to a lane. This example can also include a multi-segment protocol component to instruct the display interface to drive data to each segment of the display through the plurality of lanes. Further, one of number of lanes can be disconnected from a segment of the foldable display. In another example, a segment of the foldable display is connected to multiple lanes. This example can further include a number of display interfaces wherein each of the number of lanes connects to a different display interface. The multi-segment protocol component can, in some cases, detect a fold event when a segment is folded and instructs the display interface to drive data based on the detected fold event. In an example, the multi-segment protocol component detects when the foldable display is altered in orientation and instructs the display interface to drive data based on the detected altering of orientation. In an example, the multi-segment protocol component detects a partial fold event and instructs the display interface to drive data based on the detected partial fold event. This example can further include the detection of a fold event and instructing of the display interface to stop driving data to a segment based on the detected fold event. In an example, the foldable display includes a display panel on the opposite side of a segment of the display that receives power and driven data only when instructed by the multi-segment protocol component based on a detected fold event.

Various embodiments of the disclosed subject matter may be implemented in hardware, firmware, software, or combination thereof. The embodiments may be described by reference to or in conjunction with program code, such as instructions, functions, procedures, data structures, logic, application programs, design representations or formats for simulation, emulation, and fabrication of a design. When accessed by a machine, these instructions result in the machine performing tasks, defining abstract data types or low-level hardware contexts, or producing a result. Further, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the functions described herein. A machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Although functions may be described as a sequential process, some of the functions may in fact be performed in parallel, concurrently, and/or in a distributed environment, and with program code stored locally and/or remotely for access by single or multi-processor machines. In addition, in some embodiments the order of functions may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A mobile electronic device comprising:
    a housing having a first housing segment and a second housing segment, the first housing segment moveable relative to the second housing segment between (a) a first position in which the first housing segment is aligned with the second housing segment and (b) a second position in which the first housing segment is at an angle relative to the second housing segment;
    a first display screen supported by a first side of the housing, the first display screen including a first display section supported by the first housing segment and a second display section supported by the second housing segment;
    a second display screen supported by a second side of the housing opposite the first side of the housing;
    a sensor;
    instructions; and
    processor circuitry to execute the instructions to:
        cause first content to be presented on the first display section and the second display section of the first display screen when the first housing segment is in the first position;
        cause a modified version of the first content to be presented on a visible region of the first display screen when the first housing segment is in the second position; and
        cause second content to be presented on the second display screen when the first housing segment is in the second position.

2. The mobile electronic device of claim 1, wherein the processor circuitry is to detect a change in orientation of the mobile electronic device when the first housing segment is in the second position and cause the presentation of the modified version of the first content to be adjusted.

3. The mobile electronic device of claim 1, wherein the processor circuitry is to detect a change of the first housing segment from the first position to the second position based on outputs of the sensor.

4. The mobile electronic device of claim 1, wherein the processor circuitry is to cause the modified version of the first content to be presented on the visible region of the first display screen after relative movement of the first and second housing segments.

5. The mobile electronic device of claim 1, wherein the visible region of the first display screen is smaller than a display region of the first display screen on which the first content is presented when the first housing segment is in the first position.

6. The mobile electronic device of claim 1, wherein the modified version of the first content includes a scaled version of the first content.

7. The mobile electronic device of claim 1, wherein the first housing segment and the second housing segment lie in a same plane when the first housing segment is in the first position.

8. The mobile electronic device of claim 1, wherein the second content is associated with the first content.

\* \* \* \* \*